United States Patent
Zhao

(10) Patent No.: US 11,479,632 B2
(45) Date of Patent: Oct. 25, 2022

(54) POLYMER FILM, METHOD OF PREPARING THE SAME, AND FLEXIBLE FOLDING PANEL

(71) Applicant: WUHAN CHINA STAR OPTOELECTRONICS SEMICONDUCTOR DISPLAY TECHNOLOGY CO., LTD., Hubei (CN)

(72) Inventor: Yuan Zhao, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 340 days.

(21) Appl. No.: 16/624,149

(22) PCT Filed: Nov. 4, 2019

(86) PCT No.: PCT/CN2019/115440
§ 371 (c)(1),
(2) Date: Dec. 18, 2019

(87) PCT Pub. No.: WO2021/031359
PCT Pub. Date: Feb. 25, 2021

(65) Prior Publication Data
US 2021/0332186 A1    Oct. 28, 2021

(30) Foreign Application Priority Data

Aug. 19, 2019    (CN) .......................... 201910765176.9

(51) Int. Cl.
*C08G 18/34* (2006.01)
*C08G 18/76* (2006.01)
(Continued)

(52) U.S. Cl.
CPC ....... *C08G 18/341* (2013.01); *C08G 18/7671* (2013.01); *C08G 18/7678* (2013.01);
(Continued)

(58) Field of Classification Search
None
See application file for complete search history.

(56) References Cited

U.S. PATENT DOCUMENTS

| 3,266,987 A | 8/1966 | Crowley et al. | |
| 2012/0328855 A1* | 12/2012 | Yokogi | B29C 51/002 428/335 |
| 2014/0162076 A1* | 6/2014 | Eckert | C09D 179/08 428/473.5 |

FOREIGN PATENT DOCUMENTS

| CN | 105911618 A | 8/2016 |
| CN | 108424502 A | 8/2018 |

(Continued)

OTHER PUBLICATIONS

Wei (A facile synthesis of polyamides from aromatic diisocyanates and dicarboxylic acid catalyzed by Lewis acids, Macromol. Rapid Commun. 17, 897-903 (1996)). (Year: 1996).*

*Primary Examiner* — Rachel Kahn

(57) ABSTRACT

The present disclosure provides a polymer film, a method of preparing the same, and a flexible folded panel. The polymer film includes a substrate and a strengthening layer, wherein the strengthening layer includes a polymer, side chains of the polymer include a plurality of rigid segments and a plurality of flexible segments, which modify and strengthen the side chains of the polymer. The monomer of the polymer is subjected to a series of reactions, to synthesize the polymer, and the polymer film enhance hardness of a cover plate of a panel and improve the anti-friction properties and bendability.

10 Claims, 2 Drawing Sheets

(51) Int. Cl.
*C08G 18/78* (2006.01)
*C08J 5/18* (2006.01)
*G09F 9/30* (2006.01)

(52) U.S. Cl.
CPC ............. *C08G 18/78* (2013.01); *C08J 5/18* (2013.01); *G09F 9/301* (2013.01)

(56) References Cited

FOREIGN PATENT DOCUMENTS

| | | | |
|---|---|---|---|
| CN | 109776840 A | 5/2019 | |
| GB | 971168 A | 9/1964 | |

* cited by examiner

POLYMER FILM, METHOD OF PREPARING THE SAME, AND FLEXIBLE FOLDING PANEL

BACKGROUND OF INVENTION

Field of Invention

The present disclosure relates to a field of display technologies, and in particular, to a polymer film, a method of preparing the same, and a flexible folding panel.

Description of Prior Art

An organic light-emitting device (OLED) has the advantages of self-luminous, fast response times, light weight, and the like, compared with a liquid crystal display device, and has become an emerging technology in a field of display.

A foldable OLED display screen is one of the hotspots of current research. In the foldable display screen, a cover plate on a surface plays an important role in protection. Therefore, surface hardness of the screen directly determines safety of the screen.

However, due to requirements of the foldable device, the cover plate also needs to have good bendability and recovery performance. In order to improve the performance of the cover plate, it is necessary to add or coat a polymer material on a surface of the cover plate to improve the surface hardness and bendability of the existing cover plate, but after polymers are applied to the cover plate and the display screen, the surface hardness of the cover plate is not well matched with the bendability, wherein the surface hardness of the material may be larger while its bendability is poor, or the bendability may be better while its surface hardness is not high enough, resulting in poor quality and poor comprehensive performance of the display panel.

Therefore, there is a need to propose a solution to the problems in the prior art.

In summary, the surface harnesses of the existing organic light-emitting device (OLED) display screen and the cover plate of the display screen cannot be well matched with the bendability after adding the polymer. In an actual product, there are problems of unbalance between the surface hardness of the material and the bendability, poor quality, and poor comprehensive performance of the display screen. In response to the above problems, further solutions and improvements are needed.

SUMMARY OF INVENTION

In order to solve the above problems, the present disclosure provides a polymer film, a method of preparing the same, and a flexible folding panel, to solve the problems that the surface harnesses of the existing organic light-emitting device (OLED) display screen and the cover plate of the display screen cannot be well matched with the bendability after adding the polymer, and in an actual product, unbalance between the surface hardness of the material and the bendability, poor quality, and poor comprehensive performance of the display screen are present.

To solve the above technical problems, the technical solution provided by an embodiment of the present disclosure is as follows:

According to a first aspect of embodiments of the present disclosure, a method of preparing a polymer film is provided, including the steps of:

S100: mixing bis(3-bromo-4-isocyanatophenyl)methane with an additive for reaction to prepare a monomer;

S101: reacting the monomer with oxalic acid to prepare a polymer; and

S102: coating the polymer on a substrate to form the polymer film, wherein the monomer includes: N,N'-(methylenebis(6-isocyanato-3,1-phenylene))bis(4-hexylnaphthalen-1-amine) or N,N'-(methylene bis(6-isocyanato-3,1-phenylene))bis (10-octylanthracene-9-amine); and the polymer has a chemical structural formula as follows:

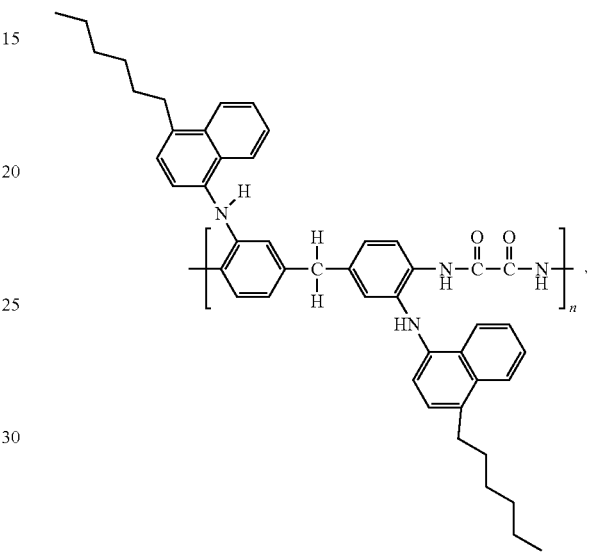

wherein n is a positive integer.

In accordance with an embodiment of the present disclosure, the additive includes 4-hexylnaphthylamine.

In accordance with an embodiment of the present disclosure, the step S100 further includes the following steps:

S200: adding the bis(3-bromo-4-isocyanatophenyl)methane and 4-hexylnaphthylamine to a flask, and adding cesium carbonate, cuprous iodide and 18-crown-6 to the flask;

S201: introducing argon gas into the flask, and adding deoxygenated N,N'-dimethylpropylene urea to the flask to form a mixture, and reacting the mixture at 180° C. for 24 hours; and S202: cooling the flask to room temperature, adding ice water to the flask, followed by extraction three times with dichloromethane, then combining organic extracts, after that, adding silica gel to the organic extracts, removing solvent from the organic extracts, and carrying out column chromatography to obtain the monomer.

In accordance with an embodiment of the present disclosure, the step S201 further includes the following steps:

S300: mixing the N,N'-(methylenebis(6-isocyanato-3,1-phenylene))bis(4-hexylnaphthalen-1-amine) and the oxalic acid in the flask for reaction at 80° C. for 12 hours;

S301: precipitating the mixture with methanol to obtain a white solid, and then extracting the white solid in n-hexane and acetone for two days to obtain the polymer.

In accordance with an embodiment of the present disclosure, the step S300 includes: introducing argon gas into the flask and adding diluted hydrochloric acid to the flask.

In accordance with an embodiment of the present disclosure, the additive includes 10-amino-9-octylanthracene.

In accordance with an embodiment of the present disclosure, the step S100 further includes the following steps:

S400: adding the bis(3-bromo-4-isocyanatophenyl)methane and 10-amino-9-octylanthracene to a flask;

S401: introducing argon gas into the flask, and adding deoxygenated N,N'-dimethylpropylene urea to the flask to form a mixture, and reacting the mixture at 180° C. for 24 hours; and S402: cooling the flask to room temperature, adding ice water to the flask, followed by extraction three times with dichloromethane, then combining organic extracts, after that, adding silica gel to the flask, removing solvent from the organic extracts, and carrying out column chromatography to obtain the monomer.

In accordance with an embodiment of the present disclosure, the step S400 further includes: adding cerium carbonate, cuprous iodide and 18-crown-6 to the flask.

In accordance with an embodiment of the present disclosure, the step S201 further includes the following steps:

S500: mixing the N,N'-(methylenebis(6-isocyanato-3,1-phenylene))bis(10-octylanthracene-9-amine) and the oxalic acid in a flask, and introducing argon gas and diluted hydrochloric acid for a reaction at 80° C. for 12 hours to obtain a mixture; and S501: precipitating the mixture with methanol to obtain a white solid, and then extracting the white solid in n-hexane and acetone for two days to obtain the polymer.

According to a second aspect of an embodiment of the present disclosure, a polymer film is provided, including:

a substrate; and a strengthening layer;

wherein the strengthening layer is disposed on the substrate, the strengthening layer includes a polymer, and side chains of the polymer include a plurality of rigid segments and a plurality of flexible segments, wherein the side chains of the polymer are modified and strengthened by the rigid segments and the flexible segments.

In accordance with an embodiment of the present disclosure, the polymer has a chemical structural formula as follows:

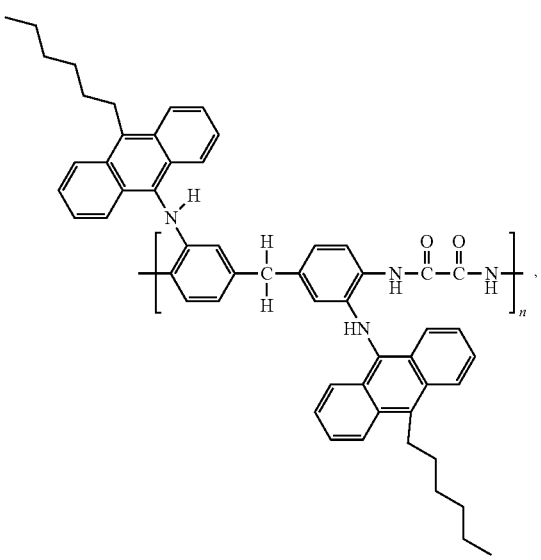

wherein n is a positive integer.

In accordance with an embodiment of the present disclosure, the polymer has a chemical structural formula as follows:

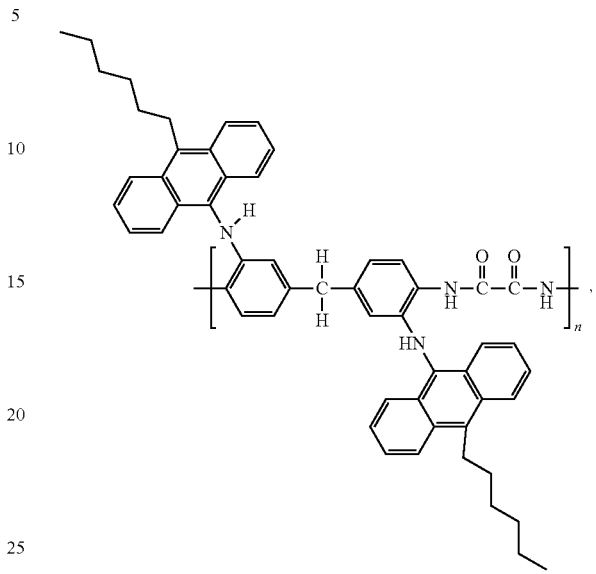

wherein n is a positive integer.

According to a third aspect of the present disclosure, a method of preparing a polymer film is further provided, including the steps of:

S100: mixing bis(3-bromo-4-isocyanatophenyl)methane with an additive for reaction to prepare a monomer;

S101: reacting the monomer with oxalic acid to prepare a polymer; and

S102: coating the polymer on a substrate to form the polymer film.

In accordance with an embodiment of the present disclosure, the monomer includes: N,N'-(methylenebis(6-isocyanato-3,1-phenylene))bis(4-hexylnaphthalen-1-amine) or N,N'-(methylenebis(6-isocyanato-3,1-phenylene))bis(10-octylanthracene-9-amine).

In accordance with an embodiment of the present disclosure, the additive includes 4-hexylnaphthylamine, and the step S100 further includes the following steps:

S200: adding bis(3-bromo-4-isocyanatophenyl)methane and 4-hexylnaphthylamine to a flask, and adding cesium carbonate, cuprous iodide and 18-crown-6 to the flask;

S201: introducing argon gas into the flask, and adding deoxygenated N,N'-dimethylpropylene urea to the flask to form a mixture, and reacting the mixture at 180° C. for 24 hours; and S202: cooling the flask to room temperature, adding ice water to the flask, followed by extraction three times with dichloromethane, then combining organic extracts, after that, adding silica gel to the organic extracts, removing solvent from the organic extracts, and carrying out column chromatography to obtain the monomer.

In accordance with an embodiment of the present disclosure, the step S201 further includes the following steps:

S300: mixing the N,N'-(methylenebis(6-isocyanato-3,1-phenylene)) bis(4-hexylnaphthalen-1-amine) and the oxalic acid in the flask for reaction at 80° C. for 12 hours; and S301: precipitating the mixture with methanol to obtain a white solid, and then extracting the white solid in n-hexane and acetone for two days to obtain the polymer.

In accordance with an embodiment of the present disclosure, the additive includes 10-amino-9-octylanthracene, and the step S100 further includes the following steps:

S400: adding bis(3-bromo-4-isocyanatophenyl)methane and 10-amino-9-octylanthracene to a flask;

S401: introducing argon gas into the flask, and adding deoxygenated N,N'-dimethylpropylene urea to the flask to form a mixture, and reacting the mixture at 180° C. for 24 hours; and S402: cooling the flask to room temperature, adding ice water to the flask, followed by extraction three times with dichloromethane, then combining organic extracts, after that, adding silica gel to the organic extracts, removing solvent from the organic extracts, and carrying out column chromatography to obtain the monomer.

In accordance with an embodiment of the present disclosure, the step S201 further includes the following steps:

S500: mixing the N,N'-(methylenebis(6-isocyanato-3,1-phenylene))bis(10-octylanthracene-9-amine) and the oxalic acid in a flask, and introducing argon gas and diluted hydrochloric acid for reaction at 80° C. for 12 hours to obtain a mixture; and S501: precipitating the mixture with methanol to obtain a white solid, and then extracting the white solid in n-hexane and acetone for two days to obtain the polymer.

DETAILED DESCRIPTION OF PREFERRED EMBODIMENTS

The following description of various embodiments refers to the additional drawings, to illustrate the specific embodiments of the present disclosure.

In order to prevent cracking of the display screen, especially the cracking of the flexible folding screen, it is generally necessary to add a cover plate to the screen, which thereby provides a good protection for the screen. However, in practical applications, especially on some flexible folding screens, the hardness of the cover plate and its bending recovery performance cannot be balanced with each other, and there are problems such as excessive or insufficient hardness and poor bendability.

Figure 1:
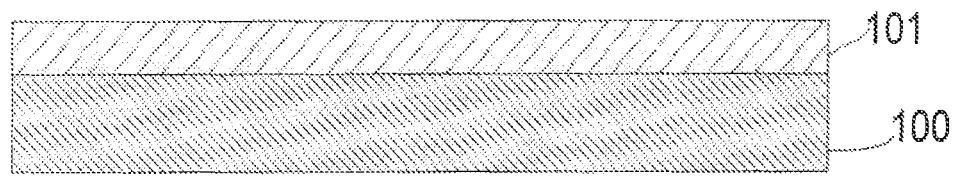
FIG. 1 is a schematic structural diagram of a polymer film according to an embodiment of the present disclosure.

In an embodiment of the present disclosure, a polymer film is provided. A cover plate for protection is mainly composed of a hardened layer and a flexible substrate, and the polymer film provided by the present disclosure is coated on the hardened layer, thereby adjusting the surface hardness and bendability of the entire cover plate. As shown in FIG. 1, FIG. 1 is a schematic structural diagram of a polymer film according to an embodiment of the present disclosure. The polymer film includes a substrate 100 and a strengthening layer 101. The strengthening layer 101 is disposed on the substrate 100, wherein the strengthening layer 101 further includes a polymer, and the strengthening layer 101 is composed of the polymers.

Specifically, the polymer is Polymer A having a chemical structural formula as follows:

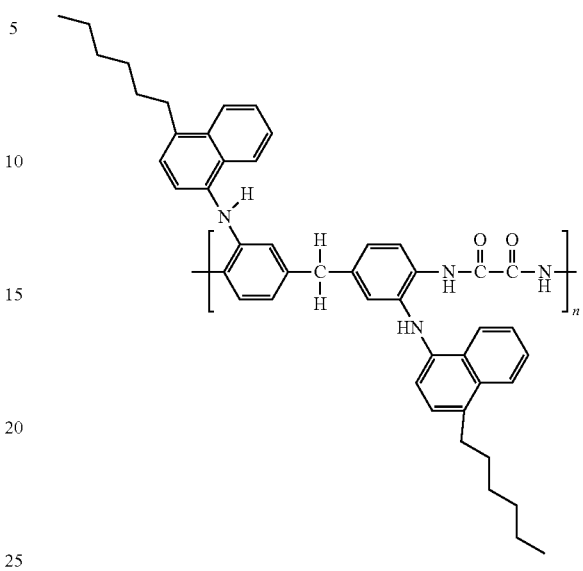

wherein n is a positive integer.

Specifically, the polymer is Polymer B having a chemical structural formula as follows:

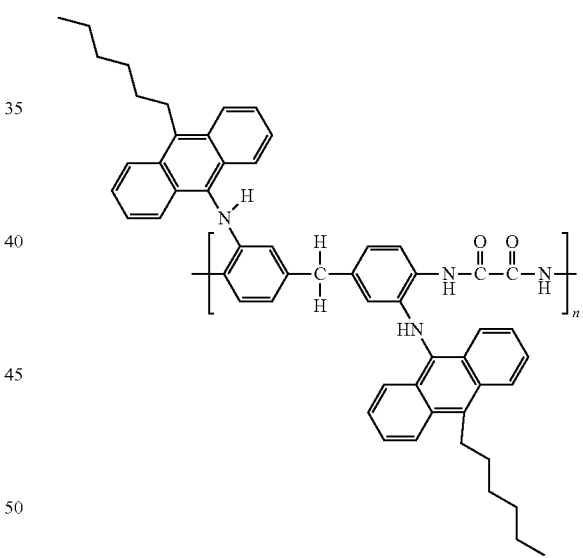

wherein n is a positive integer.

Side chains of the polymer include a plurality of rigid segments and a plurality of flexible segments to modify the side chains of the polymer, thereby achieving a purpose of reinforcement. The polymer provided by the embodiments of the present disclosure strengthens a film by introducing different proportions of rigid segments and flexible segments on the side chains and adjusting a ratio therebetween to meet the requirements of the flexible foldable display.

Figure 2:
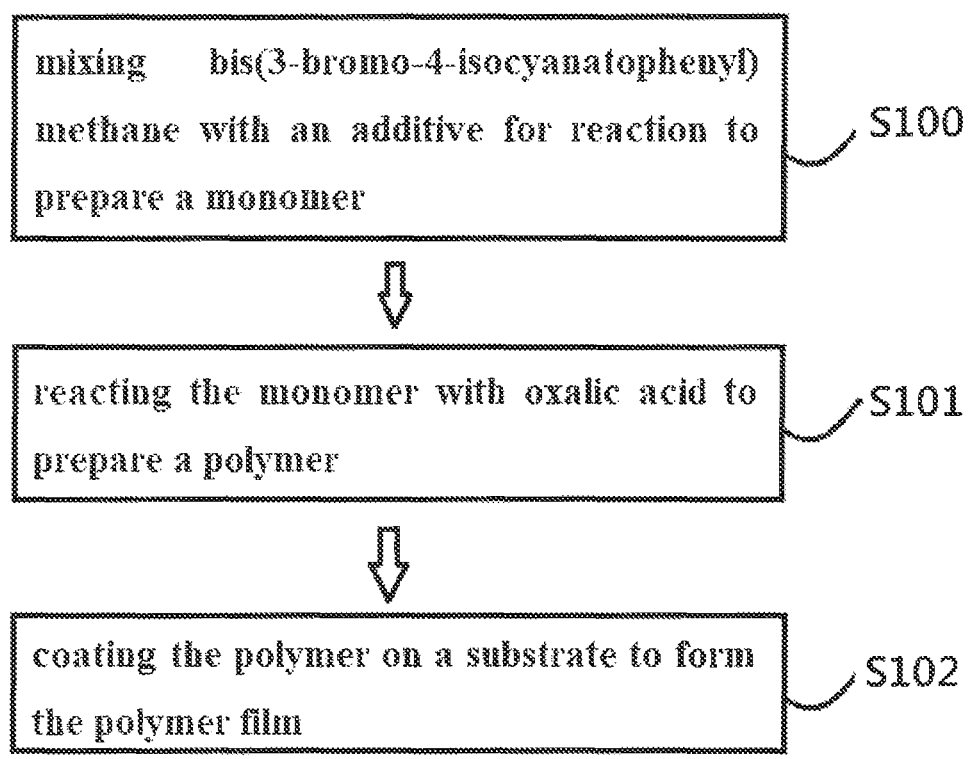
FIG. 2 is a flow chart showing a process for preparing a polymer film according to an embodiment of the present disclosure.

An embodiment of the present disclosure provides a method of preparing a polymer film. As shown in FIG. 2, FIG. 2 is a flow chart showing the method of preparing the polymer film according to an embodiment of the present disclosure, which includes the following steps:

S100: mixing bis(3-bromo-4-isocyanatophenyl)methane with an additive for reaction to prepare a monomer.

In step S100, a monomer of the polymer is mainly prepared for the preparation of the polymer in the subsequent processes.

S101: reacting the monomer with oxalic acid to prepare a polymer.

The monomer is obtained in the step S100 and subjected to a series of chemical synthesis reactions to obtain the polymer of this embodiment of the present disclosure finally.

S102: coating the polymer on a substrate to form the polymer film

Finally, the prepared polymer is coated on a substrate and dried to form a film serving as a strengthening layer on a cover plate.

Specifically, in the process of preparing the polymer, the monomer of the polymer includes: N,N'-(methylenebis(6-isocyanato-3,1-phenylene))bis(4-hexylnaphthalen-1-amine) or N,N'-(methylene bis(6-isocyanato-3,1-phenylene)) bis (10-octylanthracene-9-amine).

When the polymer is Polymer A, a chemical formula of the monomer of Polymer A is $C_{47}H_{48}N_4O_2$, that is, N,N'-(methylenebis(6-isocyanato-3,1-phenylene))bis(4-hexylnaphthalen-1-amine).

Polymer A is synthesized from monomers of Polymer A through a series of reactions. Specifically, the monomers of Polymer A are first synthesized, and the synthesis process is as follows:

Bis(3-bromo-4-isocyanatophenyl)methane (4.08 g, 10 mmol) and 4-hexylnaphthylamine (4.54 g, 20 mmol) were added to a 100 ml two-necked flask.

Then, additives which include cesium carbonate (4.62 g, 24 mmol), cuprous iodide (228 mg, 1.2 mmol) and 18-crown-6 (104 mg, 0.4 mmol) were added to the flask.

After the addition was completed, elution was carried out three times, argon gas was introduced into the flask while 50 mL of deoxygenated N,N-dimethylpropylene urea (DMPU) was added to the flask, and then the mixture was placed at 180° C. for reaction for 24 hours.

Finally, the flask was cooled to room temperature, and the mixture was poured into 100 ml of ice water, followed by extraction three times with dichloromethane, and the organic extracts were combined, after that, silica gel was added to the organic extracts, and solvent was removed from the organic extracts. Then, a separation was carried out by column chromatography, wherein the separation liquid was dichloromethane and n-hexane in a volume ratio of 1:1, a white solid of 4.2 g was obtained, and a yield of the white solid was 60% throughout the preparation process, which is higher than that in the existing production process.

Specifically, a synthetic chemical reaction of the monomer is as follows:

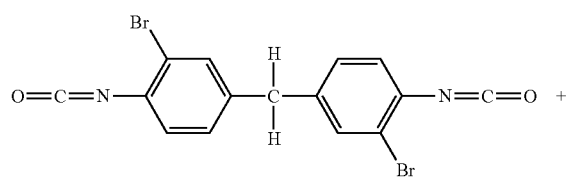

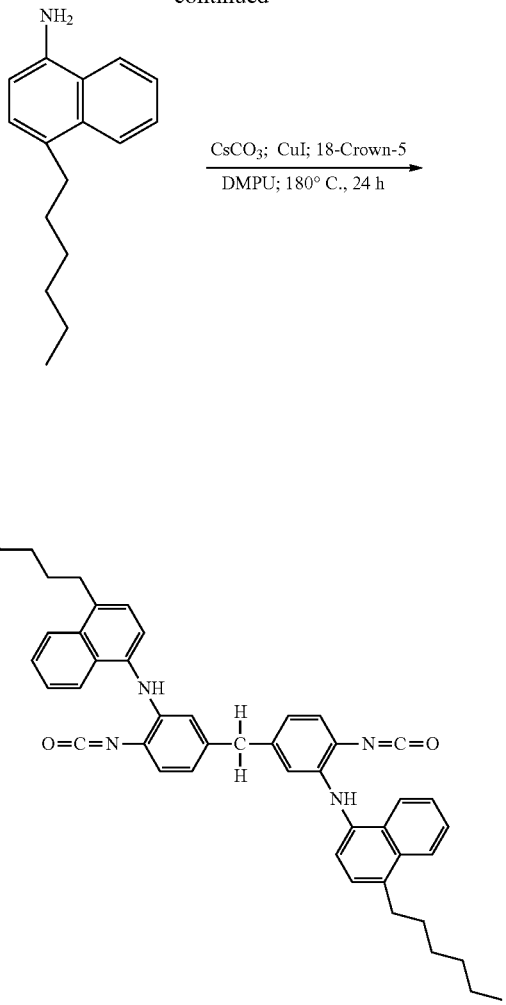

The above-mentioned white solid substance was subjected to nuclear magnetic detection and found to match the chemical formula of the monomer of the polymer A.

After the preparation of the monomer of the polymer A is completed, the polymer A is prepared from the monomer. Specifically, the following steps are included:

First, the monomer of Polymer A, namely N,N'-(methylenebis(6-isocyanato-3,1-phenylene)) bis(4-hexylnaphthalen-1-amine) (4.2 g, 6 mmol) and the oxalic acid (0.558 g, 6.2 mmol) were added to a 25 ml round bottom flask.

Then, argon gas was introduced and oxygen was purged out, and 10 ml of diluted hydrochloric acid was added, the mixture was reacted at 80° C. for 12 hours, and then the reaction was stopped.

Finally, the mixture was precipitated with 50 ml of methanol to give a white solid, and the white solid was eluted sequentially in n-hexane and acetone for two days to give 2.51 g of a colorless solid.

The yield of the polymer was determined to be 53% in the synthesis process. The polymer had a weight average molecular of 2,356 kg/mol, a number average molecular weight of 1980 kg/mol, and a dispersion of 1.83.

Specifically, the synthetic reaction from the monomer to the polymer is as follows:

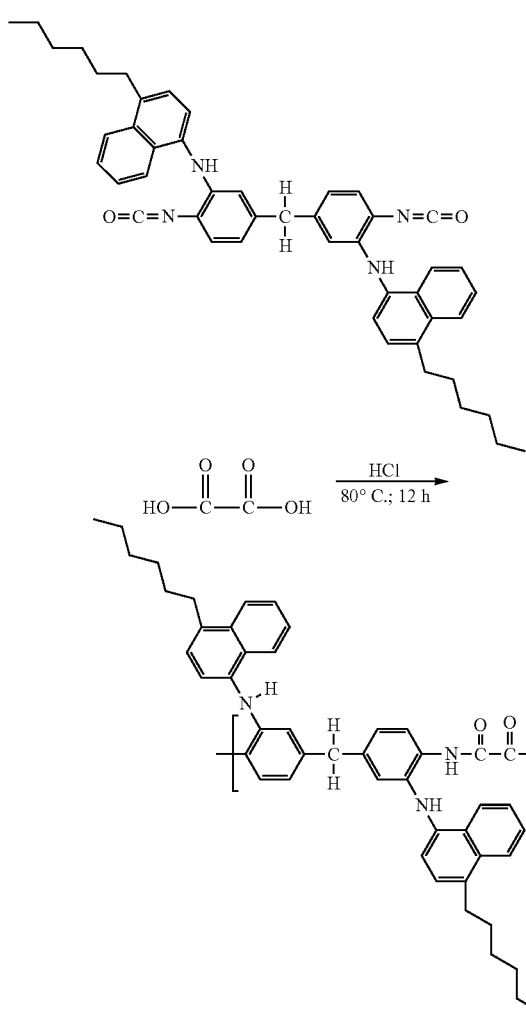

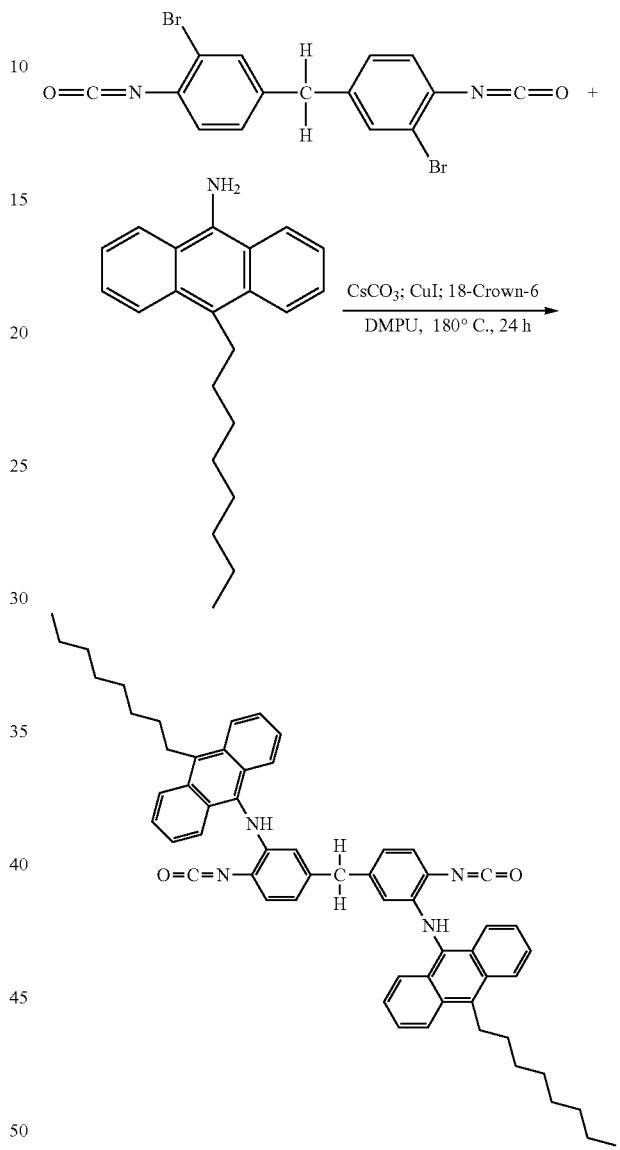

Preferably, when the polymer is Polymer B, during the synthesis, Polymer B is prepared from a monomer of Polymer B through a series of chemical synthesis. Specifically, the chemical formula of the monomer of Polymer B is $C_{59}H_{60}N_4O_2$, that is, N,N'-(methylenebis(6-isocyanato-3,1-phenylene))bis(10-octylanthracene-9-amine).

Polymer B is synthesized from monomers of Polymer B through a series of reactions. Specifically, the monomers of Polymer B are first synthesized, and the synthesis process is as follows:

First, bis(3-bromo-4-isocyanatophenyl)methane (4.08 g, 10 mmol) and 10-amino-9-octylanthracene (6.1 g, 20 mmol) were added to a 100 ml two-necked flask.

Then, additives which include cesium carbonate (4.62 g, 24 mmol), cuprous iodide (228 mg, 1.2 mmol) and 18-crown-6 (104 mg, 0.4 mmol) were added to the flask.

Subsequently, elution was carried out three times, argon gas was introduced into the flask while 50 mL of deoxygenated N,N-dimethylpropylene urea (DMPU) was added to the flask, and then the mixture was placed at 180° C. for reaction for 24 hours.

Finally, the flask was cooled to room temperature, and the mixture was poured into 100 ml of ice water, followed by extraction three times with dichloromethane, and the organic extracts were combined, after that, silica gel was added to the organic extracts, and solvent was removed from the organic extracts. Then, a separation was carried out by column chromatography (dichloromethane: n-hexane v/v=1:2) to obtain 4.1 g of a white solid with a yield of 48%.

Specifically, a synthetic chemical reaction of the monomer is as follows:

The above-mentioned white solid substance was subjected to nuclear magnetic detection and found to match the chemical formula of the monomer of Polymer B.

After the preparation of the monomer of Polymer B is completed, Polymer B is prepared from the monomer. Specifically, the following steps are included:

First, N,N'-(methylenebis(6-isocyanato-3,1-phenylene)) bis(10-octylanthracene-9-amine) (4.1 g, 4.7 mmol) and oxalic acid (0.441 g, 4.9 mmol) were added to a 25 ml round bottom flask.

Subsequently, argon gas was introduced and oxygen was purged out, and 10 ml of diluted hydrochloric acid was added, the mixture was reacted at 80° C. for 12 hours, and then the reaction was stopped.

Finally, the mixture was precipitated with 50 ml of methanol to give a white solid, and the white solid was eluted sequentially in n-hexane and acetone for two days to give a colorless solid.

The obtained white solid had a mass of 3.07 g and a yield of 68%. Polymer B had a weight average molecular weight of 2578 kg/mol, a number average molecular weight of 2043 kg/mol, and a dispersion of 1.79.

Specifically, the synthetic reaction from the monomer to Polymer B is as follows:

Polymer B was used as the strengthening layer coated on transparent polyimide, the cover plate having a surface hardness of 3H was obtained. As such, the hardness of the hardened layer is improved, and also good bendability and anti-friction properties are provided.

Figure 3:
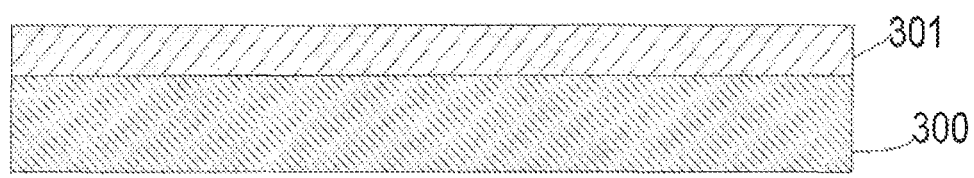
FIG. 3 is a schematic structural diagram of a flexible folding panel according to an embodiment of the present disclosure.

An embodiment of the present disclosure further provides a flexible folding panel. As shown in FIG. 3, FIG. 3 is a flexible folding panel according to an embodiment of the present disclosure. The flexible folding panel 300 is provided with a polymer film 301 according to an embodiment

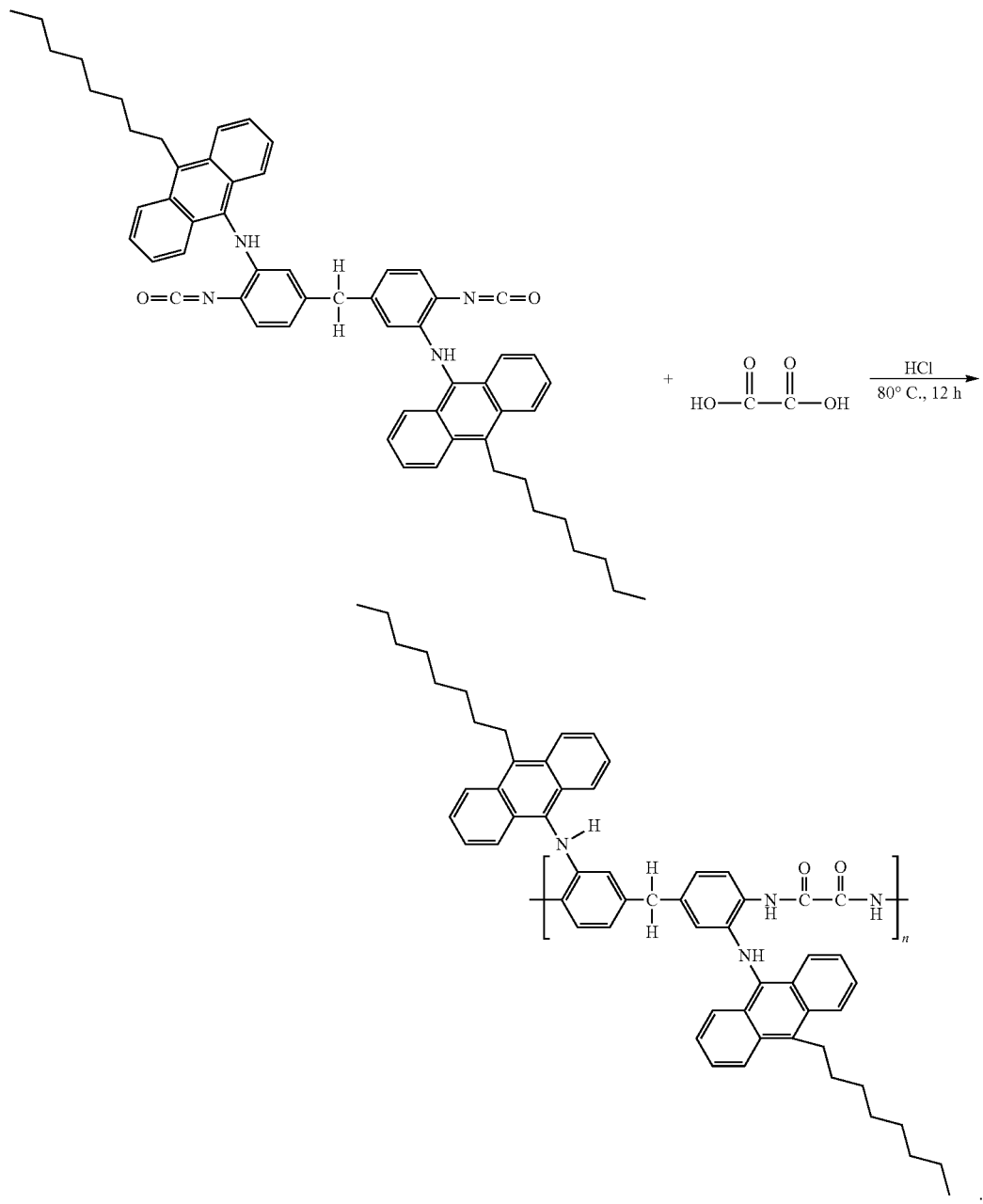

Finally, the polymer film provided by the embodiments of the present disclosure was prepared, which is applied to the cover plate, and when Polymer A was used as the strengthening layer coated on transparent polyimide, the cover plate having a surface hardness of 2H was obtained; and when of the present disclosure, and the polymer film 301 is prepared by the preparation method according to an embodiment of the present disclosure.

The polymer film, the method of preparing the same, and the flexible folding panel provided by the embodiments of the present disclosure are described in detail above. The description of the above embodiments is only for helping to understand the technical solutions of the present disclosure and the core ideas thereof; It should be understood by those skilled in the art that the technical solutions described in the foregoing embodiments may be modified, and the modifications or substitutions do not depart from the scope of the technical solutions of the embodiments of the present disclosure.

What is claimed is:

1. A method of preparing a polymer film, comprising the following steps:
   S100: mixing bis(3-bromo-4-isocyanatophenyl)methane with an additive for reaction to prepare a monomer;
   S101: reacting the monomer with oxalic acid to prepare a polymer; and
   S102: coating the polymer on a substrate to form the polymer film,
   wherein the monomer comprises: N,N'-(methylenebis(6-isocyanato-3,1-phenylene))bis(4-hexylnaphthalen-1-amine) or N,N'-(methylene bis(6-isocyanato-3,1-phenylene)) bis(10-octylanthracene-9-amine); and
   the polymer has a chemical structural formula as follows:

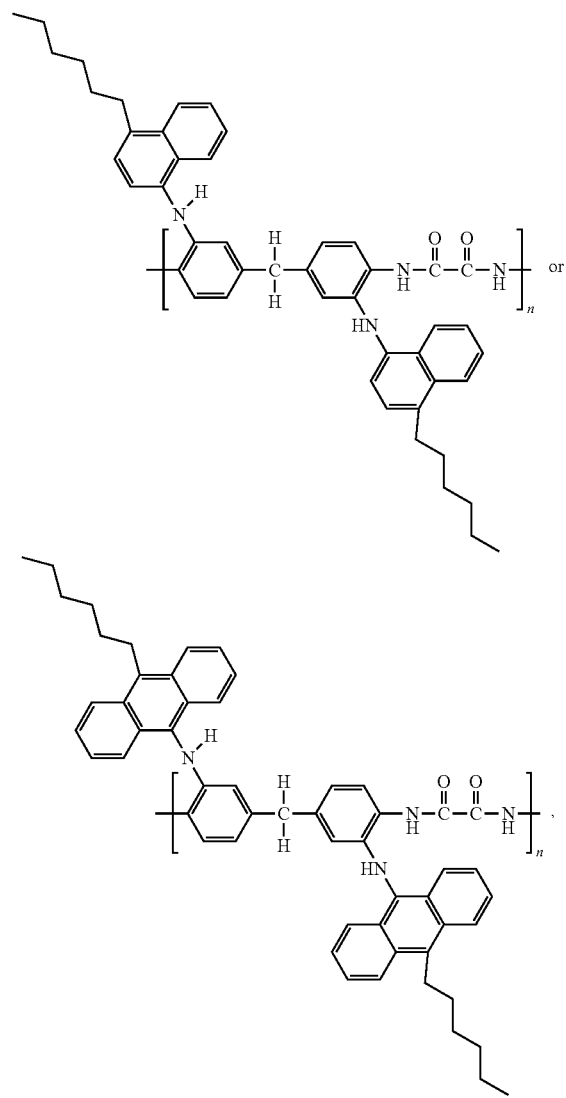

wherein n is a positive integer.

2. The method of preparing the polymer film according to claim 1, wherein the additive comprises 4-hexylnaphthylamine.

3. The method of preparing the polymer film according to claim 1, wherein the step S100 further comprises the following steps:
   S200: adding the bis(3-bromo-4-isocyanatophenyl)methane and 4-hexylnaphthylamine to a flask, and adding cesium carbonate, cuprous iodide and 18-crown-6 to the flask;
   S201: introducing argon gas into the flask, and adding deoxygenated N,N'-dimethylpropylene urea to the flask to form a mixture, and reacting the mixture at 180° C. for 24 hours; and
   S202: cooling the flask to room temperature, adding ice water to the flask, followed by extraction three times with dichloromethane, then combining organic extracts, after that, adding silica gel to the organic extracts, removing solvent from the organic extracts, and carrying out column chromatography to obtain the monomer.

4. The method of preparing the polymer film according to claim 3, wherein the step S101 further comprises the following steps:
   S300: mixing the N,N'-(methylenebis(6-isocyanato-3,1-phenylene)) bis(4-hexylnaphthalen-1-amine) and the oxalic acid in the flask for reaction at 80° C. for 12 hours;
   S301: precipitating the mixture with methanol to obtain a white solid, and then extracting the white solid in n-hexane and acetone for two days to obtain the polymer.

5. The method of preparing the polymer film according to claim 4, wherein the step S300 comprises: introducing argon gas into the flask and adding diluted hydrochloric acid to the flask.

6. The method of preparing the polymer film according to claim 1, wherein the additive comprises 10-amino-9-octylanthracene.

7. The method of preparing the polymer film according to claim 1, wherein the step S100 further comprises the following steps:
   S400: adding the bis(3-bromo-4-isocyanatophenyl)methane and 10-amino-9-octylanthracene to a flask;
   S401: introducing argon gas into the flask, and adding deoxygenated N,N'-dimethylpropylene urea to the flask to form a mixture, and reacting the mixture at 180° C. for 24 hours; and
   S402: cooling the flask to room temperature, adding ice water to the flask, followed by extraction three times with dichloromethane, then combining organic extracts, after that, adding silica gel to the flask, removing solvent from the organic extracts, and carrying out column chromatography to obtain the monomer.

8. The method of preparing the polymer film according to claim 7, wherein the step S400 further comprises: adding cerium carbonate, cuprous iodide and 18-crown-6 to the flask.

9. The method of preparing the polymer film according to claim 3, wherein the step S101 further comprises the following steps:
   S500: mixing the N,N'-(methylenebis(6-isocyanato-3,1-phenylene))bis(10-octylanthracene-9-amine) and the oxalic acid in a flask, and introducing argon gas and diluted hydrochloric acid for a reaction at 80° C. for 12 hours to obtain a mixture; and S501: precipitating the mixture with methanol to obtain a white solid, and then extracting the white solid in n-hexane and acetone for two days to obtain the polymer.

10. A polymer film comprising:

a substrate; and a strengthening layer;

wherein the strengthening layer is disposed on the substrate, the strengthening layer comprises a polymer, and side chains of the polymer comprise a plurality of rigid segments and a plurality of flexible segments, wherein the polymer has a chemical structural formula as follows:

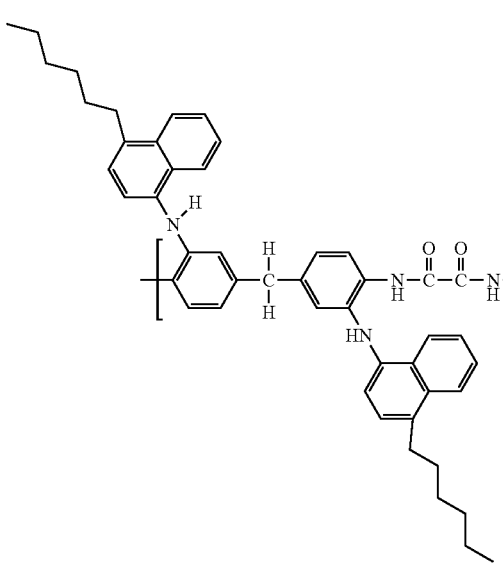

or

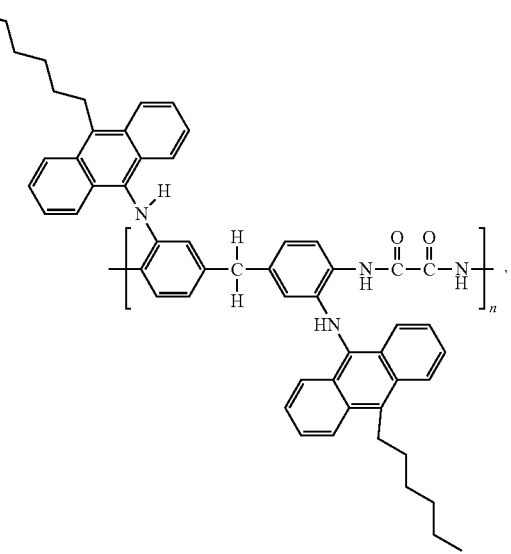

wherein n is a positive integer.

* * * * *